(12) United States Patent
Lee

(10) Patent No.: US 7,477,580 B2
(45) Date of Patent: Jan. 13, 2009

(54) METHOD AND APPARATUS FOR PERFORMING WRITING TEST USING CHARGE PUMPS IN OPTICAL DISK REPRODUCING AND RECORDING APPARATUS

(75) Inventor: So-won Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 617 days.

(21) Appl. No.: 11/289,732

(22) Filed: Nov. 29, 2005

(65) Prior Publication Data

US 2006/0114781 A1 Jun. 1, 2006

(30) Foreign Application Priority Data

Nov. 30, 2004 (KR) .................. 10-2004-0099053

(51) Int. Cl.
*G11B 7/00* (2006.01)
(52) U.S. Cl. .................. 369/47.53; 369/47.5; 369/116; 369/59.1
(58) Field of Classification Search .................. None
See application file for complete search history.

(56) References Cited

U.S. PATENT DOCUMENTS 7,046,598 B2 * 5/2006 Eom .................. 369/47.48

2003/0185118 A1 * 10/2003 Takeda .................. 369/47.39

FOREIGN PATENT DOCUMENTS

JP 2004-103045 4/2004

OTHER PUBLICATIONS

Pylarinos, Louis, "Charge Pumps: An Overview," Edward S. Rogers Sr. Department of Electrical and Computer Engineering, University of Toronto, no date provided.
Preliminary Notice of the First Office Action, Taiwanese Patent Application No. 94142017, Aug. 31, 2006.

* cited by examiner

*Primary Examiner*—Muhammad N. Edun
(74) *Attorney, Agent, or Firm*—Myers Bigel Sibley & Sajovec

(57) ABSTRACT

Provided are a method and apparatus for performing a writing test using charge pumps in an optical disk reproducing/recording apparatus. In the apparatus for performing the writing test, an optimum power control (OPC) determining unit determines a phase of a radio frequency signal using a reference voltage, and generates a corresponding OPC voltage; an analog-to-digital converter (ADC) unit converts the OPC voltage into a digital signal; and a micom controls a power control unit according to the digital signal, to appropriately control laser power.

20 Claims, 4 Drawing Sheets

FIG. 1A
(PRIOR ART)
FIG. 1B
(PRIOR ART)
FIG. 1C
(PRIOR ART)
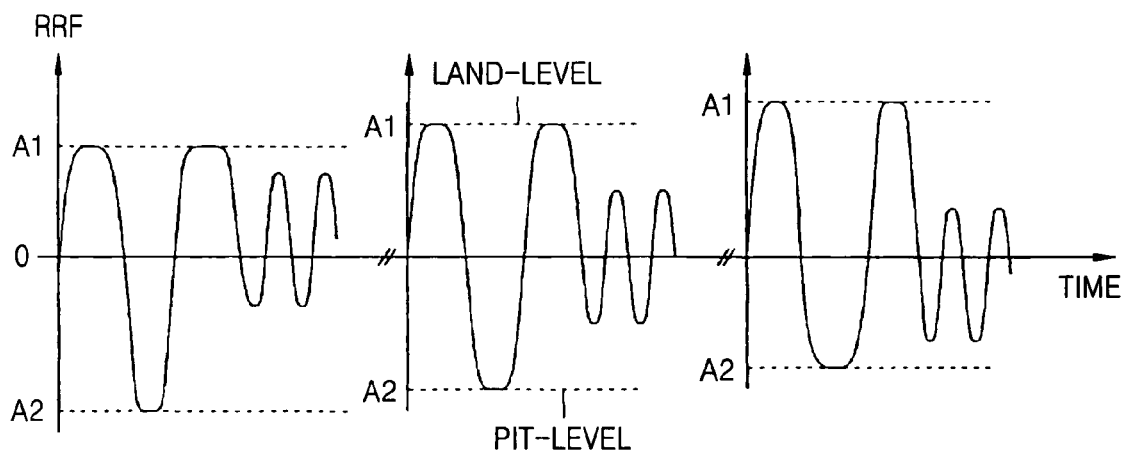
FIG. 2
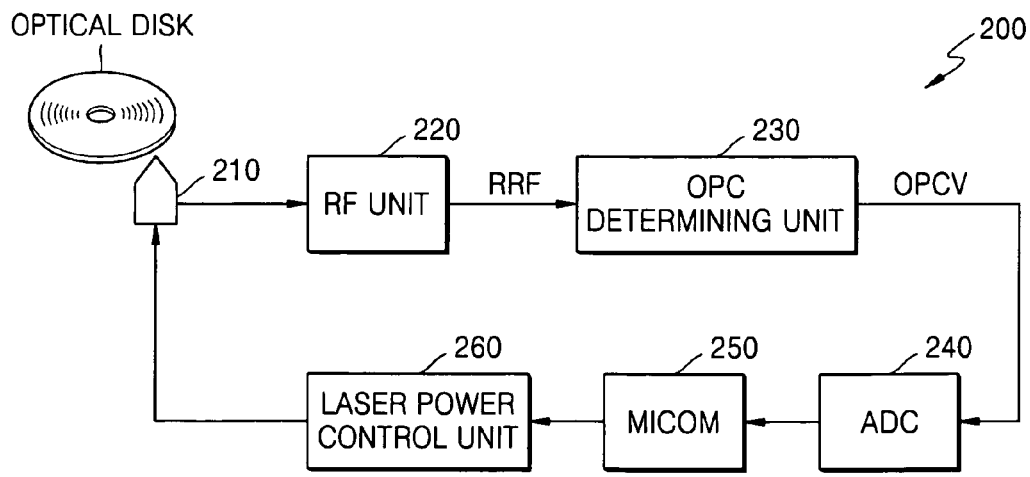

METHOD AND APPARATUS FOR PERFORMING WRITING TEST USING CHARGE PUMPS IN OPTICAL DISK REPRODUCING AND RECORDING APPARATUS

REFERENCE TO PRIORITY APPLICATION

This application claims priority to Korean Patent Application No. 10-2004-0099053, filed Nov. 30, 2004, the disclosure of which is hereby incorporated herein by reference.

FIELD OF THE INVENTION

The present invention relates to an optical disk reproducing and recording apparatus, and more particularly, to a method and apparatus for controlling recording power.

BACKGROUND OF THE INVENTION

An apparatus for reproducing data from and recording data on optical disks, such as digital video disk (DVD) combo disks, compact disk-recordable (CD-R) disks, or compact disk-rewritable (CD-RW) disks, may emit a laser beam onto a track of a disk, pick up the reflected light, and read audio or video information included in the reflected light. This recording data may include audio/video information in some applications. Audio or video information recorded on spiral tracks of a disk is typically coded into pits and lands or marks and spaces on the disks.

An apparatus for reproducing and recording data may perform optimum power control (OPC) to appropriately record wanted information on an optical disk using a laser diode (LD). The optimum laser power needed to appropriately record information on the optical disk may be found using the OPC operation, in which a laser beam is emitted on a power calibration area (PCA) located inside a lead-in region of the optical disk. The power of the laser beam may be varied from high power to low power during the OPC operation.

The amount of laser power required to record data on a disk typically varies depending on the type of reproducing/recording apparatus and type of disk. Furthermore, the amount of laser power required to record data is often different for different locations of a disk. For example, the amount of laser power for a CD-R disk recorded at a 2× speed is kept within a power window of about 2 mW in the range of 8-10 mW. If data is recorded on the disk within the power range of 8-10 mW, an appropriate sized pit may be formed. However, if the amount of laser power does not fall within the range of 8-10 mW, inappropriate sized pits may be formed. In addition, the size of a laser spot used for recording data or optical quality can be affected by temperature or external environmental factors. As such, if the pit formed on the optical disk is inappropriate due to the amount of laser power or other external factors, an error occurs while reproducing data, and thus normal audio/video data typically cannot be reproduced.

To perform OPC, a conventional optical disk reproducing/recording apparatus uses a radio frequency signal RRF generated from a picked up signal, as illustrated in FIG. 1. The amount of laser power may be controlled by detecting a land-level A1, which is the peak voltage, and a pit-level A2, which is the minimum voltage, from the radio frequency signal RRF, calculating power control information β using Equation 1 below, and then compensating direct current (DC) offset based on the calculated power control information β.

$$\beta = (A1+A2)/(A1-A2) \qquad (1)$$

For example, when β<0 as illustrated in FIG. 1A, which is the under-power state, the pit is shallow and thus the power is increased to become as illustrated in FIG. 1B. Also, when β>0 as illustrated in FIG. 1C, which is the over-power state, the pit is deep and thus the power is decreased to become as illustrated in FIG. 1B. Commonly, within ±4% of is regarded as normal to be compatible with various types of media.

However, the land-level A1 and the pit-level A2 can be inaccurately detected due to, for example, noise from the external environment, in the conventional method of performing OPC in the optical reproducing/recording apparatus. Also, even if the land-level A1 and the pit-level A2 are accurately detected, a complex circuit to calculate β using Equation 1 may be required.

SUMMARY OF THE INVENTION

The present invention provides an apparatus for performing a writing test in an optical disk reproducing/recording apparatus by determining a phase change of a radio frequency signal according to a writing power and generating a corresponding direct current voltage, in order to simplify optimum power control (OPC).

The present invention also provides a method of performing a writing test by determining a phase change of a radio frequency signal according to a writing power, in order to simplify OPC in an optical disk reproducing/recording apparatus.

According to an embodiment of the present invention, there is provided an apparatus for performing a writing test to an optical disk reproducing/recording apparatus. The apparatus includes a radio frequency (RF) unit, an OPC determining unit, an analog-to-digital converter (ADC) unit, a micom, and a power control unit. The RF unit combines a signal that is photoelectrically converted by a photodiode of a pick-up device to generate a radio frequency signal. The OPC determining unit determines a phase of the radio frequency signal using a reference voltage, and generates a corresponding OPC voltage. The ADC unit converts the OPC voltage into a digital signal. The micom generates a power setting signal from the digital signal. The power control unit determines a signal for driving a laser diode (LD) of the pick-up device, based on a writing power corresponding to the power setting signal. The OPC determining unit determines how much phase of the radio frequency signal according to the writing power has changed from a reference phase of the radio frequency signal decided by the reference voltage.

The micom generates the power setting signal in accordance with the changes in the phase. In particular, the micom lowers the level of the power-setting signal if the OPC voltage increases, and raises the level of the power-setting signal if the OPC voltage decreases. The reference voltage is set in accordance with an optical disk used to record data.

The OPC determining unit includes a comparator, an inversion circuit, a charge pumping unit, an amplifier, and a low pass filter. The comparator compares the radio frequency signal and the reference voltage and outputs the comparison result. The inversion circuit inverts the comparison result, and outputs the inversion result. The charge-pumping unit generates a first signal in proportion to a direct current (DC) level of the radio frequency signal and a second signal in inverse proportion to the DC level of the radio frequency signal, using the comparison results and the inversion results. The amplifier amplifies the difference between the first signal and the second signal. The low pass filter generates the OPC voltage by low pass filtering the amplified results.

According to another embodiment of the present invention, there is provided a method of performing a writing test of an optical disk reproducing/recording apparatus. The method includes generating a radio frequency signal by combining signals that are photoelectrically converted by a photodiode of a pick-up device, generating an OPC voltage corresponding to a phase of the radio frequency signal determined using a reference voltage, converting the OPC voltage into a digital signal, generating a power setting signal from the digital signal, and determining a signal that drives a laser diode of the pick-up device, based on a writing power corresponding to the power setting signal.

BRIEF DESCRIPTION OF THE DRAWINGS

FIG. 1 illustrates wave diagrams of radio frequency signals for explaining a conventional method of performing a writing test in an optical disk reproducing/recording apparatus;

FIG. 2 is a block diagram of an apparatus for performing a writing test in an optical pickup reproducing/recording apparatus according to an embodiment of the present invention;

DETAILED DESCRIPTION OF THE INVENTION

Figure 3:
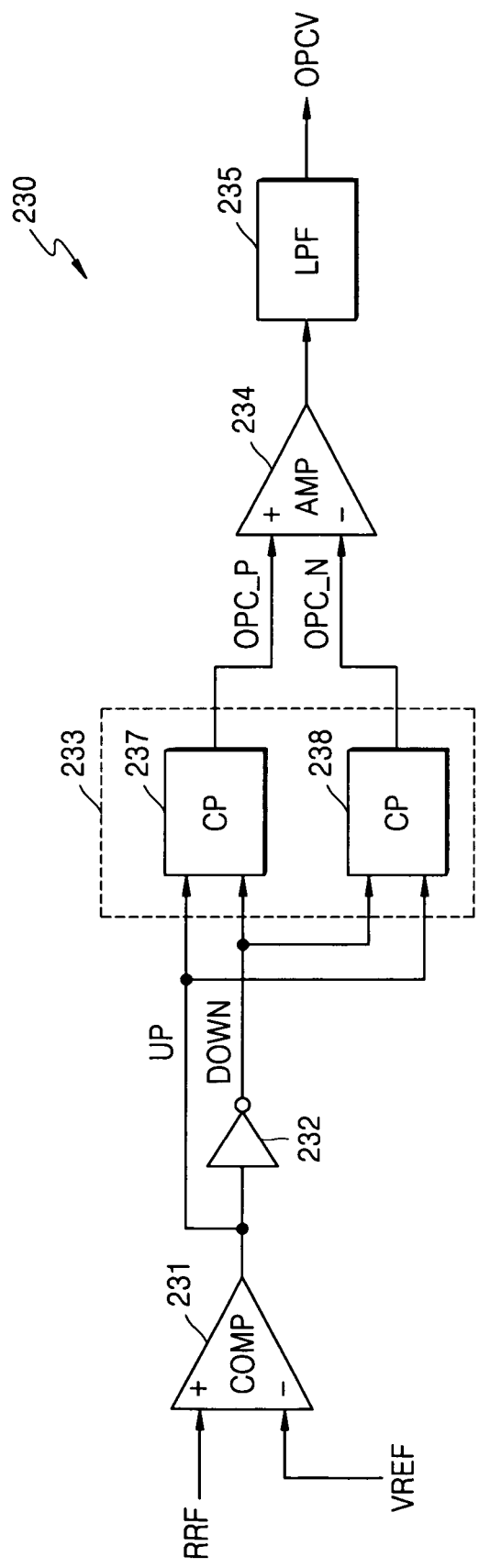
FIG. 3 is a block diagram of an optimum power control (OPC) determining unit illustrated in FIG. 2.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

A block diagram of an apparatus 200 for performing a writing test in an optical reproducing/recording apparatus according to an embodiment of the present invention is illustrated in FIG. 2. The apparatus 200 for performing the writing test includes a pick-up unit 210, a radio frequency (RF) unit 220, an optimum power control (OPC) determining unit 230, an analog-to-digital converter (ADC) 240, a micom 250, and a laser power control unit 260. Using a laser diode (LD) included in the pick-up unit 210, the apparatus 200 for performing the writing test performs OPC to appropriately record desired information before recording audio/video information on a recordable disk such as a CD-R and a CD-RW. In the present embodiment, a phase change of a radio frequency signal RRF is determined, and the OPC determining unit generates a corresponding OPC voltage OPCV. After performing OPC, data actually recorded on a disk via a predetermined recording processing unit (not shown) is produced in a corresponding radio frequency signal RRF through the RF unit 220 when reproducing the data in the optical disk reproducing/recording apparatus. This radio frequency signal RRF is decoded by a reproducing unit (not shown) and is converted into a signal that drives an audio device and a video device. A user can hear or see information coded in the disk through the audio device or the video device.

In the OPC process for performing the writing test, test information is recorded on a power calibration area (PCA) of the optical disk. This power calibration area is located inside a lead-in region of the optical disk. The OPC process may include applying high laser power at first and then lowering the laser power. The optimum laser power is found by determining whether the test information is appropriately recorded. The test information that is recorded while performing OPC may be recorded in pits on the optical disk when the LD included in the pick-up unit 210 emits laser according to a LD driving signal output from the laser power control unit 260. In addition, photodiodes included in the pick-up unit 210 can read coded information on the optical disk. Signals that are photoelectrically converted by the photodiodes are combined in the RF unit 220 and output as the radio frequency signal RRF.

Although not illustrated in FIG. 2, the pickup-up unit 210 includes a focusing actuator, which moves towards or away from a recording surface of the optical disk on which information is recorded, so that a laser beam emitted from the LD is focused precisely on the optical disk when recording or reproducing data, and a tracking actuator, which moves towards the center or the outer circumference of the optical disk so that the laser beam can accurately follow along a track of the optical disk.

The OPC determining unit 230 determines the phase of the radio frequency signal RRF generated by the RF unit 220 using a reference voltage VREF for comparison, and generates a corresponding OPC voltage OPCV. The phase of the radio frequency signal RRF changes according to the writing power. The OPC determining unit 230 determines the difference between the phase of the radio frequency signal RRF and the reference phase, which is decided by the reference voltage VREF.

The ADC 240 converts the OPC voltage OPCV into a digital signal. The micom 250 generates a power setting signal from the digital signal. The micom 250 generates the power setting signal corresponding to the phase change of the radio frequency signal RRF. In particular, if the OPC voltage OPCV increases, the level of the power setting signal is lowered, and if the OPC voltage OPCV decreases, the level of the power setting signal is increased. The laser power control unit 260 determines a signal for driving the LD of the pick-up unit 210 based on the corresponding writing power, which is indicated by the power setting signal generated by the micom 250.

Through the operation mentioned above, the power setting signal of the micom 250 is decided, and the power setting signal at the reference phase of the radio frequency signal RRF is set in accordance with the optical disk used to record data. The reference phase of the radio frequency signal RRF is a pre-determined value so that the writing power is appropriate, and is decided by the reference voltage VREF. The reference phase may be set within a margin (e.g., 4%), which allows some room for error.

Figure 6:
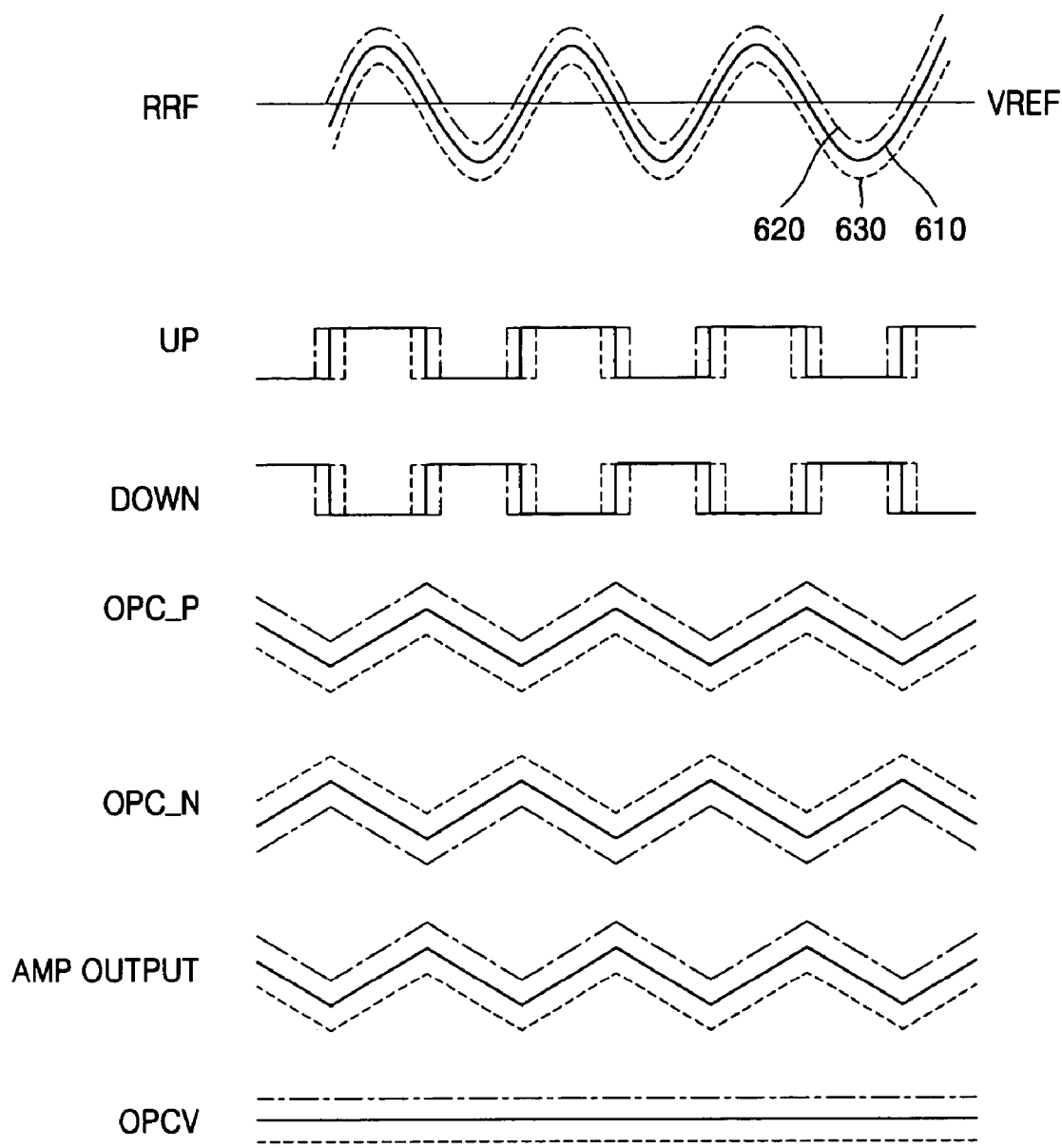
FIG. 6 illustrates timing diagrams of signals for explaining the operation of the OPC estimation unit illustrated in FIG. 3.

FIG. 3 is a block diagram of the OPC determining unit 230 illustrated in FIG. 2. Referring to FIG. 3, the OPC determining unit 230 includes a comparator 231, an inversion circuit 232, a charge-pumping unit 233, an amplifier 234, and a low pass filter 235. The comparator 231 compares the radio frequency signal RRF generated by the RF unit 220 and the reference voltage VREF, and then outputs a comparison result UP. The inversion circuit 232 inverts the comparison result UP, and outputs an inversion result DOWN. Timing diagrams of the comparison result UP and the inversion result DOWN according to radio frequency signals 610, 620, and 630 generated by the RF unit 220 are illustrated in FIG. 6. In FIG. 6, the reference phase of the radio frequency signal RRF is determined using the reference voltage VREF. The phase of the radio frequency signal RRF that is compared changes depending on the level of the reference voltage VREF. The reference voltage VREF is a direct current (DC) voltage that is set by estimating an appropriate writing power in accordance with the optical disk used to record data in advance. For example, when the reference voltage VREF is set as illustrated in FIG. 6, the phase of the radio frequency signal RRF 610 that is pre-determined to be appropriate for the writing power acts as a reference phase, and the OPC determining unit 230 determines the phase difference between the phases of each of the radio frequencies 610, 620, and 630, which change according to the reference phase and the writing power.

Moreover, when the radio frequency signal RRF 620 as illustrated in FIG. 6 is generated in response to the pits and lands recorded on the optical disk, it indicates an over-power state. The DC level of the radio frequency signal RRF 620 is higher than that of the radio frequency signal RRF 610 having the reference phase. Accordingly, the logic high state of an UP signal is lengthened and the logic high state of a DOWN signal is shortened, as illustrated in FIG. 6. Conversely, when the radio frequency signal RRF 630 is generated, it indicates an under-power state. The DC level of the radio frequency signal RRF 630 is lower than that of the radio frequency signal RRF 610 having the reference phase. Accordingly, the logic high state of the UP signal is shortened and the logic high state of the DOWN signal is lengthened, as illustrated in FIG. 6.

The charge-pumping unit 233 includes a first charge pump 237 and a second charge pump 238. The charge pumping unit 233 generates a first signal OPC_P which is in proportion to the DC level of the radio frequency signal RRF and a second signal OPC_N which is in inverse proportion to the DC level of the radio frequency signal RRF, using the comparison result UP and the conversion result DOWN, respectively.

Figure 4:
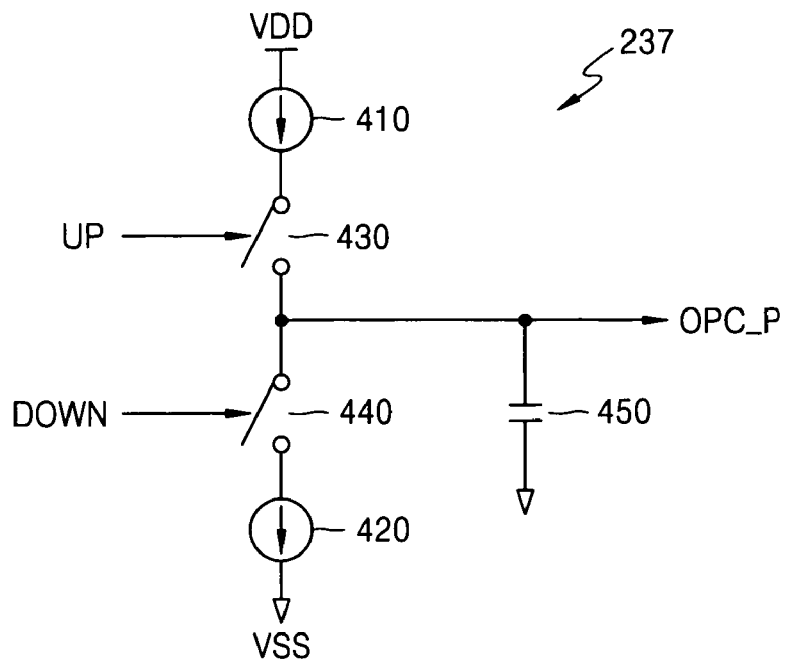
FIG. 4 is a circuit diagram of a first charge pump illustrated in FIG. 3.

FIG. 4 is a circuit diagram of the first charge pump 237 illustrated in FIG. 3. Referring to FIG. 4, the first charge pump 237 includes current sources 410 and 420, first and second switches 430 and 440, and a capacitor 450. Since the current flowing to the capacitor 450 from a first power source VDD via the first switch 430 is higher than the current flowing to the capacitor 450 from a second power source VSS via the second switch 440, when the logic high state of the comparison result UP is lengthened and the logic high state of the inversion result DOWN is shortened, the DC level of the first signal OPC_P is high. Conversely, when the logic high state of the comparison result UP is shortened and the logic high state of the inversion result DOWN is lengthened, the current flowing to the capacitor 450 from the first power source VDD via the first switch 420 is lower than the current flowing to the capacitor 450 from the second power source VSS via the second switch 440. Thus, the DC level of the first signal OPC_P is low. The switches 420 and 430 may be transistors.

Figure 5:
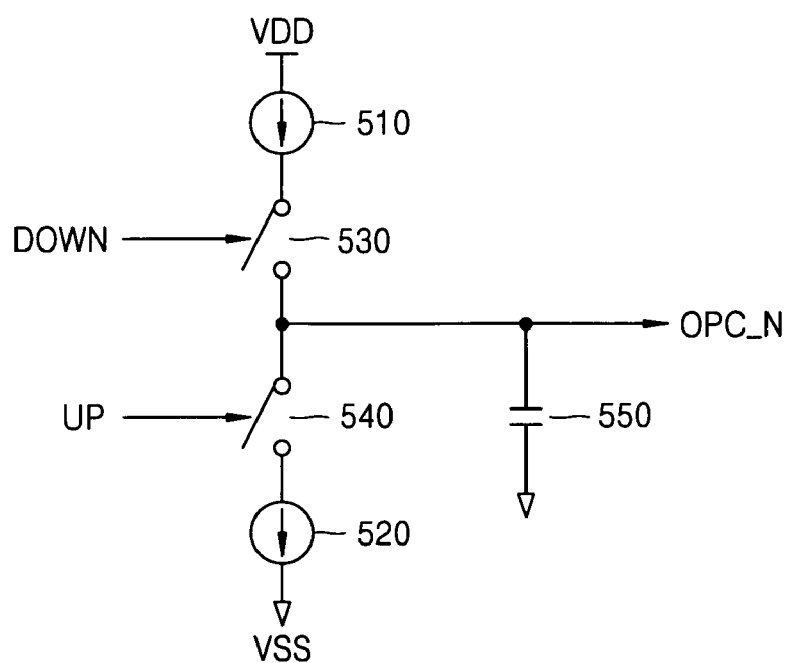
FIG. 5 is a circuit diagram of a second charge pump illustrated in FIG. 3.

FIG. 5 is a circuit diagram of the second charge pump 238 illustrated in FIG. 3. Referring to FIG. 5, the second charge pump 238 includes current sources 510 and 520, first and second switches 530 and 540 and a capacitor 550. The second charge pump 238 has the same structure as the first charge pump 237. The first switch 530 is controlled by the inversion result DOWN and the second switch 540 is controlled by the comparison result UP. Apart from this, the operation of the second charge pump 238 is the same as the operation of the first charge pump 237. That is, the second charge pump 238 outputs a voltage obtained by charging and discharging at the capacitor 550 as the second signal OPC_N according to the output to the capacitor 550 current which is in inverse proportion to the logic high state of the comparison result UP and in proportion to the logic high state of the conversion result DOWN.

Therefore, as illustrated in FIG. 6, the output level of the first charge pump 237 which corresponds to the radio frequency signal RRF 620 is higher than the output level of the first charge pump 237 which corresponds to the radio frequency signal RRF 610, and the output level of the second charge pump 238 which corresponds to the radio frequency signal RRF 630 is higher than the output level of the second charge pump 238 which corresponds to the radio frequency signal RRF 610.

Consequently, as the amplifier 234 amplifies the difference between the first and second signals OPC_P and OPC_N, a signal with higher DC level is output if the writing power is high, and a signal with lower DC level is output if the writing power is low, as illustrated in FIG. 6. The low pass filter 235 filters the output of amplifier 234 and generates the OPC voltage OPCV.

The micom 250 generates a power-setting signal from the digital signal, which is obtained by the ADC 240 converting the OPC voltage OPCV determined by the OCP determining unit 230. The micom 250 reduces the level of the power setting signal if the OPC voltage OPCV increases and increases the level of the power setting signal if the OPC voltage OPCV decreases, so that the radio frequency signal RRF having similar phase to the reference phase can be generated at the RF unit 220. The laser power control unit 260 determines a signal for driving the LD of the pick-up unit 210, such that the LD has a writing power that corresponds to the power-setting signal.

If the radio frequency signal RRF 610 having the reference phase is generated by the RF unit 220, the micom 250 sets the power setting signal for recording audio/video data on the optical disk to a level that generates the radio frequency signal RRF 610. If the radio frequency signal RRF is within the reference phase and a certain phase margin, the power setting signal set in the above-mentioned way can be maintained at the same level.

When the power setting signal for recording the audio/video data is set in the micom 250, necessary information can be recorded on the optical disk while maintaining an appropriate writing power of the LD by a predetermined recording processing unit (not shown). The LD driving signal output from the laser power control unit 260 drives the LD included in the pick-up unit 210, and the LD radiates a laser beam having a writing power that corresponds to the LD driving signal to form pits and lands or marks and spaces on the optical disk. The power of the LD needs to be appropriately controlled in order to record data on the optical disk. Generally, the power of a LD required to form a pit on a current track is affected by not only the lengths of the current pit and land, but also the lengths of the previous and following pits and lands, when recording.

In the apparatus 200 for performing the writing test of the optical disk reproducing/recording apparatus according to an embodiment of the present invention described above, the OPC determining unit 230 determines phase changes of the radio frequency RRF according to the writing power using the reference voltage VREF, and generates the corresponding OPC voltage OPCV. Accordingly, the ADC 240 converts the OPC voltage OPCV into the digital signal, and the micom 250 appropriately controls the laser power by controlling the power control unit 260 according to the digital signal.

As described-above, in an apparatus for performing a writing test of an optical disk reproducing/recording apparatus, the phase change amount of a radio frequency signal according to the writing power is determined as a certain DC voltage by using charge pumps and a low pass filter. Since the power of a laser is controlled according to the determined DC voltage, the apparatus for performing the writing test may be configured in a simplified circuit to perform the OPC, and a stable writing test can be performed by appropriately responding to changes in the external environment.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical disk recording device, comprising:
    a calibration device configured to drive a recording laser diode at a calibrated power level, said calibration device comprising:
        a signal generator configured to convert a photoelectric signal generated by an optical disk pick-up device into a radio frequency signal;
        a power control determining circuit configured to generate an analog output voltage in response to determining a phase difference between the radio frequency signal and a reference signal;
        an analog-to-digital converter configured to generate a digital signal in response to the analog output voltage;
        a micom unit configured to generate a power setting signal in response to the digital signal; and
        a laser diode power control circuit configured to generate a calibrated power signal for the recording laser diode in response to the power setting signal.

2. The recording device of claim 1, wherein said optical pick-up device is a photodiode.

3. The recording device of claim 1, wherein said micom unit is configured to increase a level of the power setting signal when the digital signal reflects a decrease in the analog output voltage and decrease a level of the power setting signal when the digital signal reflects an increase in the analog output voltage.

4. The recording device of claim 1, wherein said power control determining circuit comprises a comparator having a first input terminal responsive to the radio frequency signal and a second input terminal responsive to a DC reference voltage.

5. The recording device of claim 4, wherein said power control determining circuit further comprises at least one charge pump configured to receive an output signal from said comparator.

6. The recording device of claim 5, wherein said power control determining circuit further comprises a differential amplifier having a first input terminal electrically coupled to an output of said at least one charge pump.

7. An apparatus for performing a writing test to an optical disk reproducing/recording apparatus, the apparatus comprising:
    a radio frequency unit, which combines a signal that is photoelectrically converted by a photodiode of a pick-up device to generate a radio frequency signal;
    an optimum power control (OPC) determining unit, which determines a phase of the radio frequency signal using a reference voltage, and generates a corresponding OPC voltage;
    an analog-to-digital converter (ADC) unit, which converts the OPC voltage into a digital signal;
    a micom which generates a power setting signal from the digital signal; and
    a power control unit, which determines a signal for driving a laser diode of the pick-up device, based on a writing power corresponding to the power setting signal.

8. The apparatus of claim 7, wherein the OPC determining unit determines how much phase of the radio frequency signal according to the writing power has changed from a reference phase of the radio frequency signal decided by the reference voltage.

9. The apparatus of claim 8, wherein the micom generates the power setting signal in accordance with to the changes in the phase.

10. The apparatus of claim 8, wherein the micom lowers the level of the power setting signal if the OPC voltage increases, and raises the level of the power setting signal if the OPC voltage decreases.

11. The apparatus of claim 8, wherein the reference voltage is set in accordance with an optical disk used to record data.

12. The apparatus of claim 7, wherein the OPC determining unit comprises:
    a comparator, which compares the radio frequency signal and the reference voltage, and outputs the comparison result;
    an inversion circuit, which inverts the comparison result, and outputs the inversion result;
    a charge pumping unit which generates a first signal in proportion to a direct current (DC) level of the radio frequency signal and a second signal in inverse proportion to the DC level of the radio frequency signal, using the comparison results and the inversion results;
    an amplifier which amplifies the difference between the first signal and the second signal; and
    a low pass filter, which generates the OPC voltage by low pass filtering the amplified results.

13. The apparatus of claim 12, wherein the charge pumping unit comprises:
    a first charge pump which generates the first signal according to a current that is proportional to the comparison results and inversely proportional to the inversion results; and
    a second charge pump, which generates the second signal according to a current, that is inversely proportional to the comparison results and proportional to the inversion results.

14. A method of performing a writing test of an optical disk reproducing/recording apparatus, the method comprising:
    generating a radio frequency signal by combining signals that are photoelectrically converted by a photodiode of a pick-up device;
    generating an OPC voltage corresponding to a phase of the radio frequency signal determined using a reference voltage;
    converting the OPC voltage into a digital signal;
    generating a power setting signal from the digital signal; and
    determining a signal that drives a laser diode of the pick-up device, based on a writing power corresponding to the power setting signal.

15. The method of claim 14, wherein determining how much a phase of the radio frequency signal according to the writing power has changed from a reference phase of the radio frequency signal, which is determined by the reference voltage.

16. The method of claim 15, the power setting signal is generated in accordance with the phase change.

17. The method of claim 15, wherein if the OPC voltage increases, a level of the power setting signal is lowered, and if the OPC voltage decreases, a level of the power setting signal is raised.

18. The method of claim 15, wherein the reference voltage is set in accordance with an optical disk used to record data.

19. The method of claim 14, wherein the generating of the OPC voltage comprises:

outputting a comparison result after comparing the radio frequency signal and the reference voltage;

outputting an inversion result after inverting the comparison result;

generating a first signal that is proportional to a DC level of the radio frequency signal and a second signal that is inversely proportional to the DC level of the radio frequency signal, using the comparison result and the inversion result;

amplifying a difference between the first signal and the second signal; and generating the OPC voltage by low pass filtering the amplified result.

20. The method of claim 19, wherein the generating of the first signal and the second signal comprises:

generating the first signal according to a current that is proportional to the comparison result and inversely proportional to the inversion result; and generating the second signal according to a current that is inversely proportional to the comparison result and proportional to the inversion result.

* * * * *